United States Patent
Fang et al.

(10) Patent No.: US 9,693,367 B2
(45) Date of Patent: Jun. 27, 2017

(54) CONTENTION ARBITRATION USING CODE DIVISION MULTIPLEXING

(71) Applicant: ZTE Corporation, Shenzhen (CN)

(72) Inventors: Yonggang Fang, San Diego, CA (US); Bo Sun, Shenzhen (CN); Anming Jiang, Shenzhen (CN); ZhiQiang Han, Shenzhen (CN); Kaiying Lv, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 236 days.

(21) Appl. No.: 14/596,150

(22) Filed: Jan. 13, 2015

(65) Prior Publication Data
US 2015/0201434 A1    Jul. 16, 2015

(51) Int. Cl.
*H04W 74/08* (2009.01)
*H04L 1/00* (2006.01)
*H04W 28/06* (2009.01)
*H04W 72/12* (2009.01)
*H04W 84/12* (2009.01)

(52) U.S. Cl.
CPC ........... *H04W 74/0816* (2013.01); *H04L 1/00* (2013.01); *H04W 28/06* (2013.01); *H04W 72/12* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,068,632 B1* | 6/2006 | Ho | H04W 28/26 370/338 |
| 7,499,425 B2* | 3/2009 | Yew | H04L 12/5695 370/329 |
| 2003/0161340 A1* | 8/2003 | Sherman | H04L 47/24 370/445 |
| 2003/0198244 A1* | 10/2003 | Ho | H04W 74/06 370/442 |
| 2008/0112351 A1* | 5/2008 | Surineni | H04W 74/0816 370/312 |
| 2011/0268054 A1* | 11/2011 | Abraham | H04W 74/06 370/329 |
| 2013/0170480 A1 | 7/2013 | Novak et al. | |

(Continued)

FOREIGN PATENT DOCUMENTS

| WO | 2015/068968 A1 | 5/2015 |
|---|---|---|
| WO | 2015/074461 A1 | 5/2015 |
| WO | 2016/210389 A1 | 12/2016 |

OTHER PUBLICATIONS

International Search Report and Written Opinion mailed on Oct. 12, 2016 for International Application No. PCT/US2016/039449, filed on Jun. 25, 2016 (12 pages).

*Primary Examiner* — Candal Elpenord
(74) *Attorney, Agent, or Firm* — Perkins Coie LLP

(57) ABSTRACT

Access to a wireless medium is controlled based on contention arbitration. A certain number of wireless devices are allowed to contend for a transmission opportunity. Requests from these wireless devices are processed based on codes contained in the requests. Winning wireless devices are given access to the wireless medium by transmitting a contention arbitration message. In some implementation, codes in the request are selected from an orthogonal or pseudo orthogonal code set.

32 Claims, 18 Drawing Sheets

(56) References Cited

U.S. PATENT DOCUMENTS

2013/0286959 A1* 10/2013 Lou .................. H04W 72/04
                                                                                  370/329
2015/0063258 A1    3/2015  Merlin et al.
2015/0071051 A1    3/2015  Zhu et al.
2016/0278081 A1    9/2016  Chun et al.

* cited by examiner

CONTENTION ARBITRATION USING CODE DIVISION MULTIPLEXING

CROSS REFERENCE TO RELATED APPLICATIONS

This patent document claims the benefit of priority under 35 U.S.C. §119(a) and the Paris Convention of International Patent Application No. PCT/CN2014/070530, filed on Jan. 13, 2014, and International Patent Application No. PCT/CN2014/086307, filed on Sep. 11, 2014. The entire contents of the before-mentioned patent applications are incorporated by reference herein.

BACKGROUND

This patent document relates to wireless communication.

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). The infrastructure BSS is the BSS with stations through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies, among other things, a code-based sensing multiple accesses with contention arbitration (CBSMA/CA) mechanism to improve the medium usage efficiency and reduce transmission latency in wireless communications.

In one aspect, a method is provided for stations to contend the medium in the virtual code-based sensing multiple accesses with contention arbitration (CBSMA/CA) mechanism. In some embodiments, the CBSMA/CA can manage the contention time period within a couple of symbols, which would significantly improve the efficiency of medium usage comparing to the legacy CSMA/CA mechanism.

In another aspect, a method is provided for CBSMA/CA capable stations to map a virtual code into the physical code for transmission and adjust the virtual code space to control the density of code usage in contention requests. In some embodiments, through adjustment, the CBSMA/CA capable AP is able to control the probability of collisions of transmitting contention request frames in the contention period and the probability of collisions in transmitting PPDU frames in HEWOP without increasing the contention window in time domain of legacy CSMA/CA. This would reduce the time wasted in the medium usage during the contention.

In another aspect, a special preamble is provided in the contention request frame of CBSMA/CA to allow other stations to sense the medium busy via clear channel assessment (CCA) detection mechanism and to allow the CBSMA/CA capable AP to detect the transmission of contention request frame. The first three fields of special preamble field are backward compatible to the legacy specification. Due to fixed values of the special preamble field, the CBSMA/CA mechanism allows multiple transmitted special preambles to be detected by others stations. In addition, the special preamble of contention request frame could be used to reduce the probability of false detection of contention request and false triggering HEWOP.

In another aspect, a method of using a special preamble is provided in the contention arbitration frame to allow other stations to sense the medium busy via CCA detection mechanism and to allow the CBSMA/CA contending station(s) to acquire the contention arbitration frame. Similarly to the special preamble field of contention request frame, the special preamble of contention arbitration frame could be used to reduce the probability of false detection of contention arbitration and false triggering HEWOP.

In another aspect, a method of using distinguishable multiple contention request frames from different stations is provided via assigning an orthogonal sequence, e.g., a CAZAC (constant amplitude zero auto correlation) or a Zadoff-Chu sequence to each contending station in code domain. With the auto-correlation and cross-correlation characteristics of Zadoff-Chu sequences, the AP could be able to distinguish the contention request frames from different stations.

In another aspect, a method of increasing real contention code space is provided via concatenating two or more Zadoff-Chu symbols, which would provide a flexible way to increase physical contention space to reduce collision possibility due to less available number of Zadoff-Chu sequences in a single symbol.

In yet another aspect, a method is provided for CBSMA/CA contending station(s) to know winning station(s) for the coming HEWOP via the contention arbitration frame. Multiple winning stations could be able to transmit or receive PPDUs sequentially in the order the occurrence of codes in the contention arbitration frame sent from CBSMA/CA AP, or transmit simultaneously using OFDMA or UL MU-MIMO mechanism. In this way, the AP could be able to schedule communications with multiple stations in a HEWOP so as to reduce the switching time before downlink and uplink transmission.

In yet another aspect, a method is provided how to protect the contention period of CBSMA/CA and period of HEWOP transmission to reduce the interference from other neighbor stations.

Details of the above aspects and their implementations are set forth in the accompanying drawings, the description and the claims.

DETAILED DESCRIPTION

This document describes techniques, mechanisms, devices, and systems for multiple accesses using code-based sensing with contention arbitration (CBSMA/CA) mechanism to improve transmission efficiency in contention based wireless communications.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
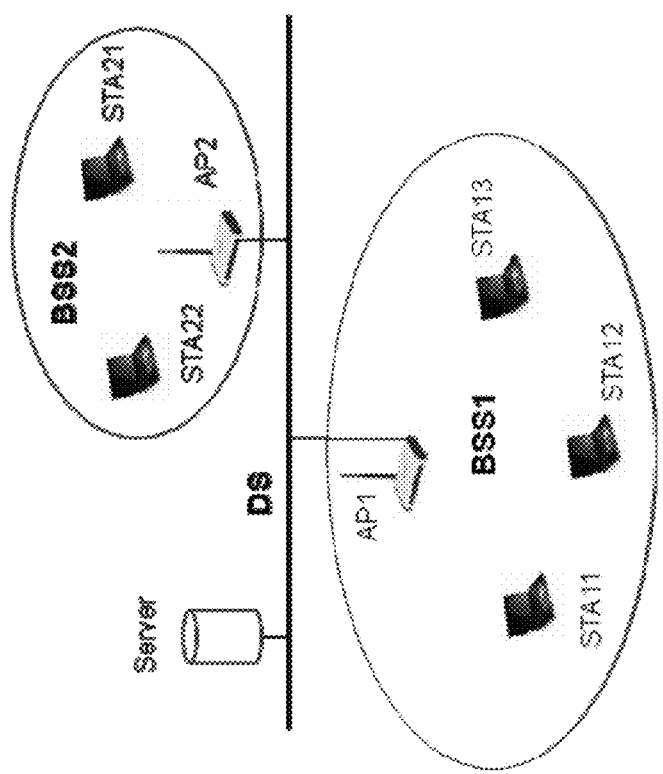
FIG. 1 shows an example of infrastructure BSS in a wireless communication system.

FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a server through a distribution system (DS). A central station being associated with other stations and dedicated to manage the BSS is referred to an Access Point (AP). A BSS built around an AP is called an infrastructure BSS.

IEEE 802.11 wireless communications support multiple access and provide two types of access control mechanisms for multiple stations to access the medium:

A) Distributed Coordination Function (DCF)

B) Point Coordination Function (PCF).

PCF (or its enhanced version HCCA) is a centrally controlled multiple Media Access Control (MAC) mechanism used in IEEE 802.11 based WLANs. PCF resides in an AP to coordinate the communication within the BSS. The AP waits for PIFS to contend the medium after the medium is sensed in idle. With higher priority than DCF, AP can contend the medium earlier than other stations and send a CF-Poll frame to the PCF capable stations to schedule its transmissions. If the polled station does not have any frames to send, it shall transmit null frame to the AP. Otherwise, the polled station will take the transmission opportunity to send its data frames to the AP over the medium.

Since PCF (or HCCA) uses polling mechanism for multiple access control, i.e. it alternatively in time polls all the associated stations to check whether they have data to send, it may encounter channel efficiency issue when there are a large number of associated stations in the deployment cases such as the hotspot of public area or conference room. When the number of associated stations is large, but less number of active (i.e. stations that want to send packets to the network), the PCF polling mechanism is not very efficiency and causes a lot of medium waste.

DCF, on the other hand, relies on the carrier sensing multiple access with collision avoidance (CSMA/CA) mechanism to control the multiple medium access. Each station implements a CSMA/CA function. Before access to the wireless medium, the station has to sense the medium occupancy using CSMA/CA. If the station senses the medium busy, it has to wait and retry sensing the medium in later time. If the station senses the medium in idle, it will wait for some inter frame space (IFS) and then enter the contention window (CW). In order to support multiple stations to access the medium, each station has to backoff a random time before transmitting over the medium so that the access to medium could be evenly distributed.

Figure 2:
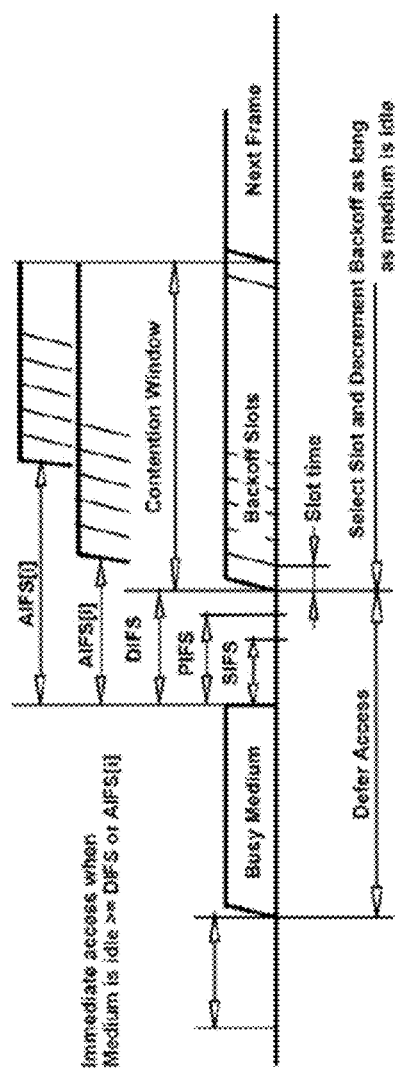
FIG. 2 shows an example of prior art CSMA/CA mechanism in DCF of IEEE 802.11.

FIG. 2 illustrates an example of a CSMA/CA mechanism of DCF in the current 802.11 specification. A station senses the medium. If the medium is sensed busy, the station defers until the medium is determined as idle plus a period of time equal to xIFS when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

In order to allow multiple stations to contend the medium, the DCF CSMA/CA mechanism uses the backoff time control mechanism in the contention window after waiting for xIFS period. Each station in the contention window has to backoff a random time to distribute the transmission evenly in the time domain to reduce the collision. The backoff time is defined as $$\text{backoff Time} = \text{Random}( ) \times a\text{SlotTime} \qquad \text{Eq. (1)}$$

Where Random( )=Pseudo random integer uniformly distributed over the interval [0, CW], and CW is an integer:

$$aCW\text{min} \leq CW \leq aCW\text{max} \qquad \text{Eq. (2)}$$

The existing CSMA/CA mechanism used in IEEE 802.11 has significant overhead in each transmission and issue of medium utilization efficiency especially when a large number of stations share the same medium and are going to transmit simultaneously.

Figure 3:
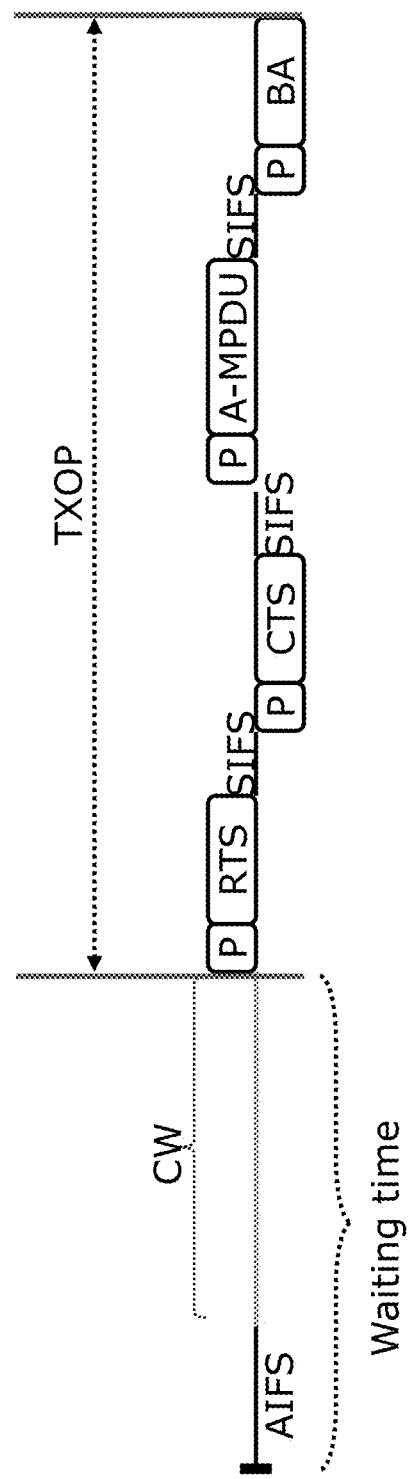
FIG. 3 shows an example of transmission overhead in EDCA of IEEE 802.11.

FIG. 3 shows an example of waiting time in medium idle in the current IEEE802.11 CSMA/CA mechanism. In the contention interval, the waiting time contains Arbitrate Inter Frame Space (AIFS) and Contention Window (CW) for backoff time. This waiting time is used to reduce the probability of collision in the contention period.

Figure 4:
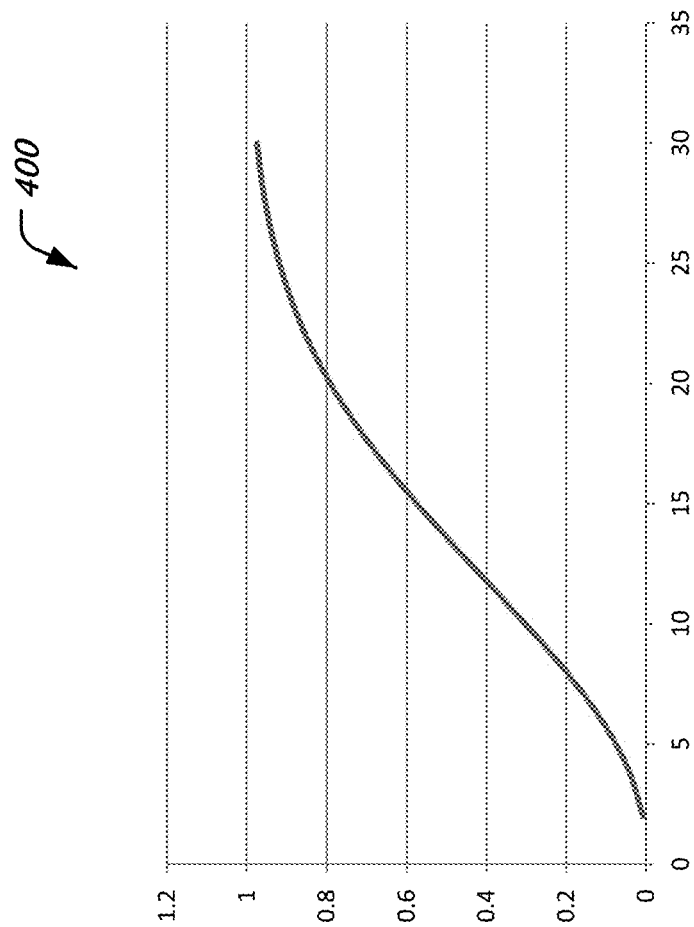
FIG. 4 shows an example of collision probability for different number of stations at CW=128.

FIG. 4 shows an example graph 400 of probability of collisions for different number of stations at CW=128. The more stations contend the medium at the same time (plotted along the horizontal axis), the more probability of collision (plotted along the vertical axis). As the number of contending stations reaches a certain level, the collision probability is very high (e.., greater than 90%). Therefore it may be desirable to increase the contention window size to reduce the probability of collision.

Increasing the contention window size would however reduce the medium usage efficiency. At CW=128, the average waiting time is about 64 slot time, which causes less medium utilization efficiency.

In addition to the overhead in CSMA/CA mechanism, the downlink or uplink TXOP allocation for equal share of air time creates a fairness issue for AP during contention. When many stations are associated with the AP, and in active transmission state, the possibility of transmission opportunity for every associated station and AP is same according to the CSMA/CA or EDCA mechanism. However AP is the aggregated point of BSS to send all the DL frames to all the associated stations. If AP has the same possibility in contending TXOP as other stations, the chance of AP getting into TXOP is lower and lower as the number of associated stations increases. This will cause the DL throughput drops quickly as the number of associated stations reaches a certain threshold.

The present document discloses a channel access mechanism called code-based sensing multiple access with contention arbitration (CBSMA/CA). In some embodiments, the disclosed technique can be used to improve the medium utilization efficiency. In some embodiments, the disclosed technique can be used to improve user experience, e.g., by reducing network latency.

In one advantageous aspect, the CBSMA/CA channel access mechanism combines certain advantages of PCF and DCF mechanisms. For example, in some embodiments, the CBSMA/CA can be implemented as a pre-contention and arbitration procedure before actual occupying the medium. CBSMA/CA can reduce the waiting time in idle state to a fixed amount while reducing the probability of collisions within a certain level.

In some embodiments, instead of contending the medium in time domain used by EDCA, CBSMA/CA mechanism manages the contention in the code domain.

In some embodiments, instead of judging the medium occupancy by contending stations, the CBSMA/CA mechanism in the AP arbitrates the contention and notifies winning stations for transmissions in the following transmission opportunity, called High Efficiency WLAN Opportunity (HEWOP). The arbitration procedure lets the AP control the transmissions from multiple stations and reduce the probability of collisions in HEWOP. In HEWOP, a single transmission from the winning station may be allocated, or sequential transmissions from multiple winning stations are allowed according to the order of contention codes' occurrence in the contention arbitration frame so as to reduce the switching (gap) time between downlink and uplink transmissions.

Compared to the legacy CSMA/CA mechanism, the CBSMA/CA mechanism could improve the medium usage efficiency significantly especially in the high density deployment scenario.

In some embodiments, to support fairness of medium sharing with legacy CSMA/CA stations, the CBSMA/CA mechanism categorizes the medium occupancy in different time slots: legacy TXOP time slots for CSMA/CA stations to access the medium and HEWOP time slots for CBSMA/CA capable stations to access the medium. The CBSMA/CA capable AP is responsible to transmit the indication of the type of an upcoming transmission opportunity slot in a control frame, management frame, beacon or other type of frames to control CBSMA/CA capable stations to access the medium only in HEWOP slots.

Figure 5A:
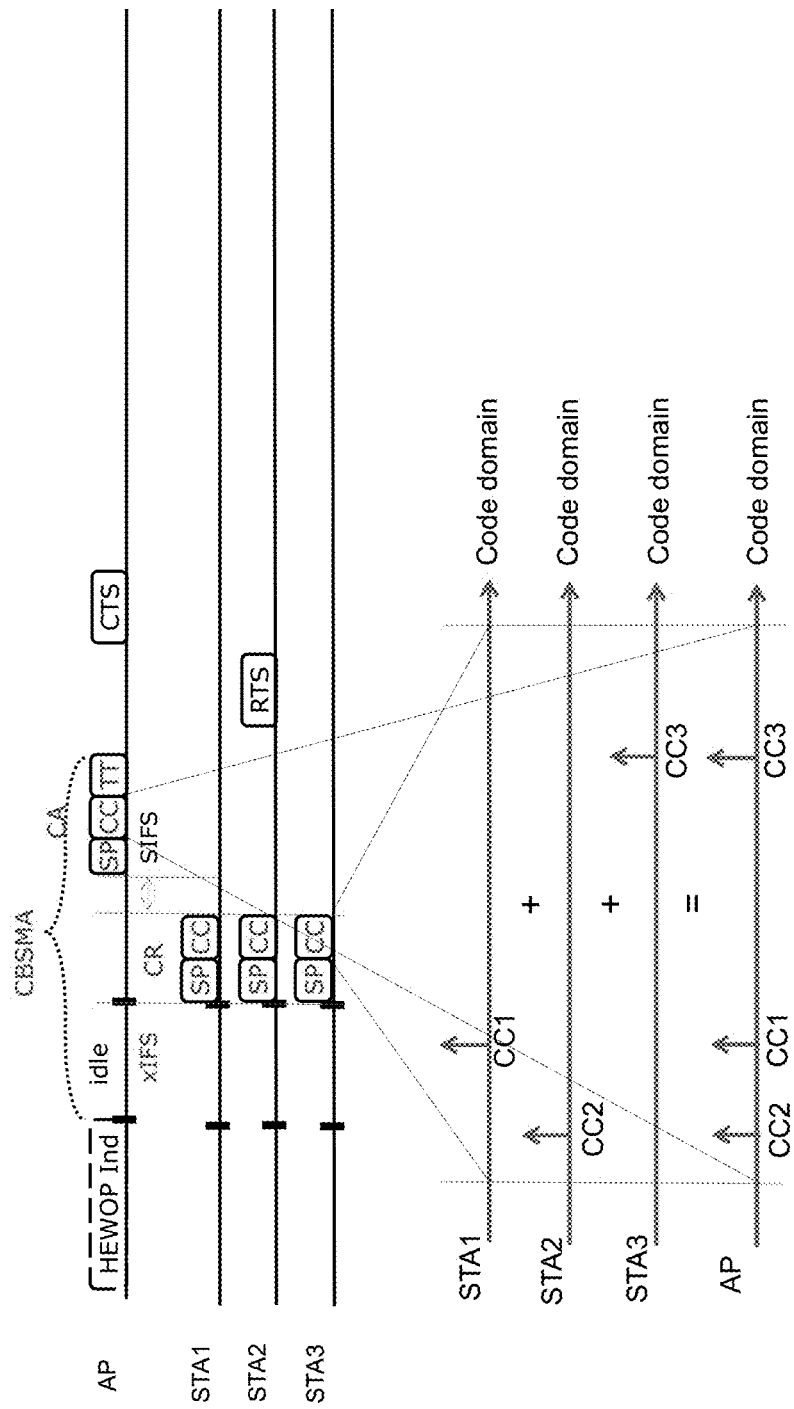
FIG. 5A shows an example of CBSMA/CA mechanism.

FIG. 5A shows an example of AP indicating the HEW transmission by HEWOP Indication in the control frame such as a CTS-to-self frame.

When sensing the medium idle and its NAV=0, the CBSMA/CA AP transmits a frame with HEWOP indication to notify the following time slot is used for HEW transmissions. The CBSMA/CA AP should set its Duration field of the frame to the time used by CBSMA process: xIFS+CR+ SIFS+CA+m×SIFS (where "m" is the maximum number of short backoff time, depending on CBSMA/CA AP's configuration. "0" means no backoff, and SIFS is the short interframe space), and set up a timer of CBSMA to the value of Duration. Legacy stations and CBSMA/CA stations in OBSS could use the BSS identifier in the frame with HEWOP indication to differentiate OBSS and may also use the Duration information of the frame to update their NAV values. CBSMA/CA stations in the BSS may not update their NAV values to extend to CBSMA period since they may need to contend the medium during CBSMA. If the CBSMA/CA AP does not receive any CR during CBSMA period and its timer of CBSMA expires, the CBSMA/CA AP releases this HEWOP by default. A station that used information from the frame with HEWOP Indication as the most recent basis to update its NAV is permitted to reset its NAV if no CA frame is detected. Once the HEWOP is released, the CBSMA/CA AP has to contend the medium again with other stations if it still wants to use the medium.

The CBSMA/CA AP could also use other ways to indicate HEW transmission slot, such as using a beacon frame, a control frame or a management frame. This frame with the HEWOP indication could be initiated by the CBSMA/CA capable AP or a response frame to a STA. This control frame, management frame or beacon frame could be used by CBSMA/CA capable stations to perform timing synchronization with the timing resource of AP.

When the medium is sensed idle and the coming slot is indicated for HEWOP transmission by the AP, then CBSMA/CA capable stations with NAV=0 in the BSS could contend the medium using code-based sensing multiple access with contention arbitration mechanism. In HEWOP slot, CBSMA/CA capable stations are given a little higher priority (i.e. transmission earlier in time) than legacy stations to contend the medium so as to prevent from legacy CSMA/CA stations to compete the medium with CBSMA/CA stations at the same time.

In order to provide fair access for legacy CSMA/CA stations and CBSMA/CA stations, the CBSMA/CA AP can adjust the frequency of occurrences of HEWOP slot indication for coming slot according to the ratio of the number of legacy CSMA/CA stations and the number of CBSMA/CA stations, to provide two types stations with fair time of access to the medium on average or other ratio of access time between two types of stations based on the operation policy such as access network loading.

In some embodiments, when the medium is indicated for HEWOP transmission, a CBSMA/CA capable station waits for xIFS time depending on the next transmission type. xIFS could be SIFS, DIFS, PIFS, EIFS or AIFS. If the CBSMA/CA station still senses the medium idle, it uses the CBSMA/CA mechanism to contend the medium via transmitting a Contention Request (CR) frame in the primary channel, and/or the duplicated CR frame in the secondary channel if the station intends to occupy the secondary channel for transmission as well.

In some embodiments, a CR frame may include a short special preamble (SP) field followed by a field of single or a sequence of contention-code (CC) symbols.

Figure 5B:
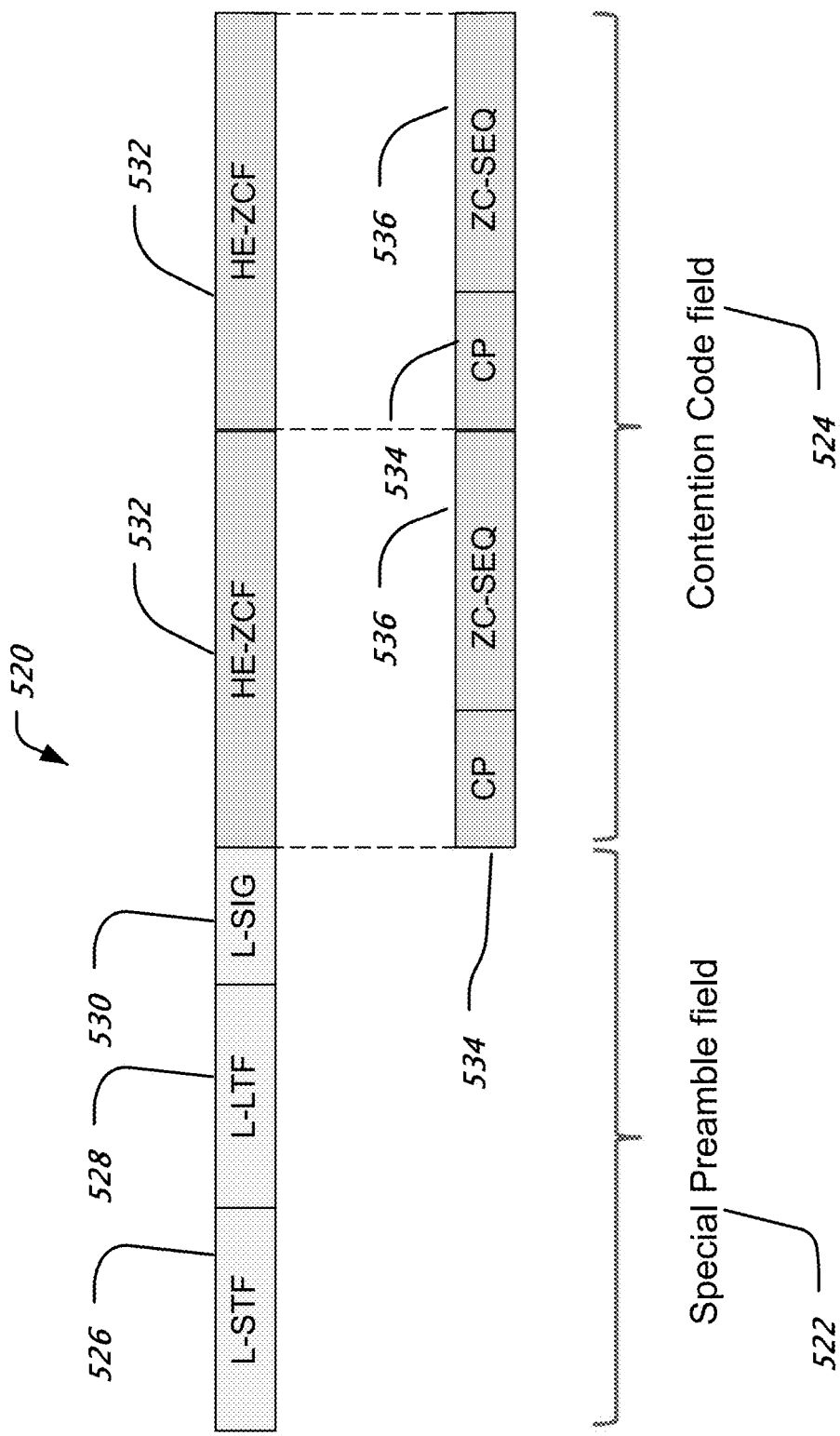
FIG. 5B shows an example of CBSMA/CA frame structure.

FIG. 5B shows an example of CR frame structure 520 in PHY layer. The CR frame structure contains the Special Preamble (SP) field 522 and Contention Code (CC) field 524. The symbol length of SP field and symbol length of CC field could be same or different.

One purpose of Special Preamble (SP) field 522 in CR frame 520 is that the SP field may be used by AP and other STAs for the timing and frequency synchronization and for CCA detection so as to protect the CBSMA/CA contention from legacy EDCA stations during the CBSMA period, if legacy stations and HEW stations were deployed in the same area and on the same frequency channel. Another purpose of SP field 522 may be to identify the current contention window for CBSMA transmission.

Figure 5C:
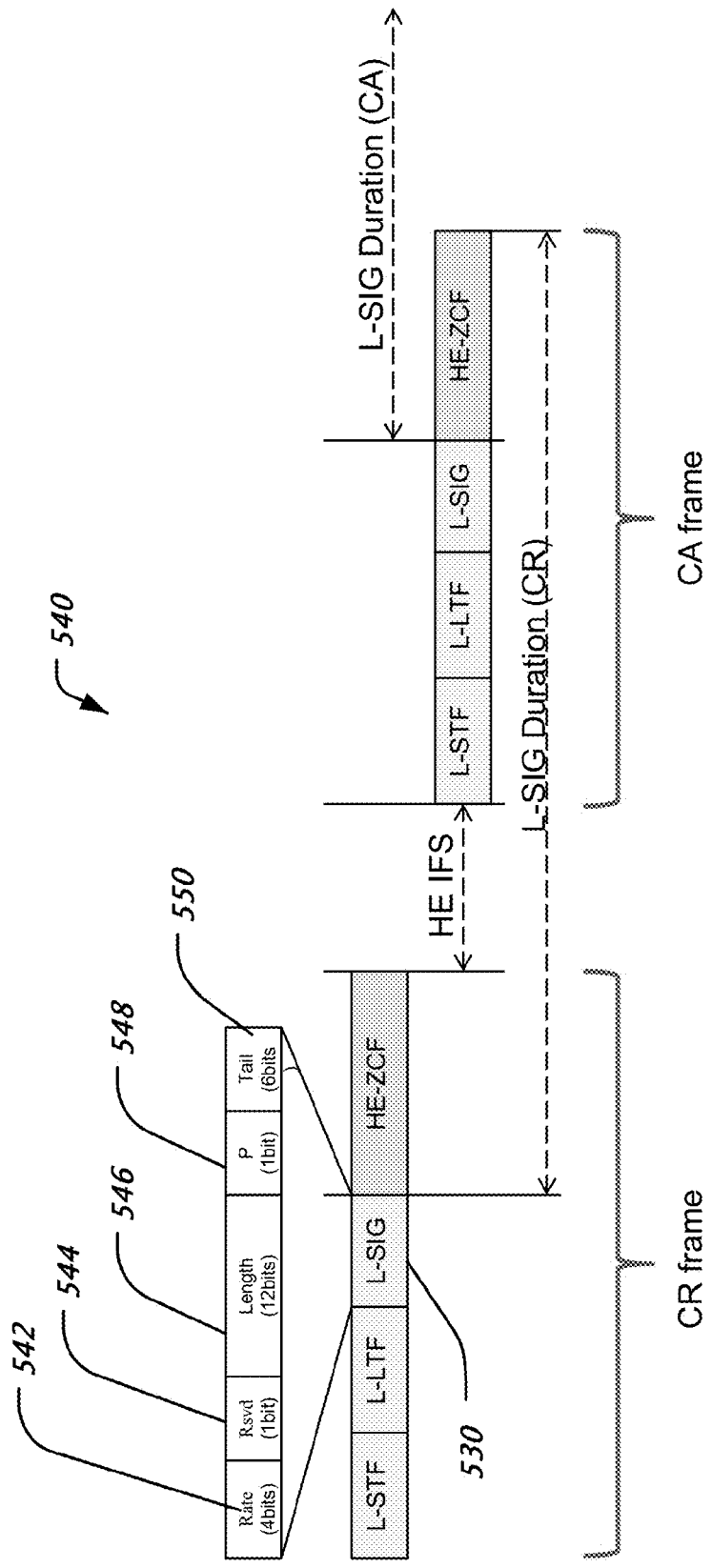
FIG. 5C shows an example of L-SIG settings for CBSMA/CA frames.

The SP field 522 may consist of multiple sub-fields or OFDM symbols. The example illustrated in FIG. 5C shows fields like L-STF 526, L-LTF 528 and L-SIG 530, which may be used for backward compatibility to the legacy STAs. When the CBSMA/CA stations share the same frequency channel with legacy stations, the first two sub-fields may be the same as the legacy preamble (L-STF 526 and L-LTF 528) so that legacy stations could detect medium occupancy with legacy CCA detection mechanism. If stations miss detecting the first two sub-fields on SP, they could apply the energy detection mechanism in the middle packet transmission to detect the medium usage status. The L-SIG field 530 in the SP 522 is also used for compatibility to legacy STAs, but it may be set to the fixed values by all CBSMA/CA capable stations, as shown in FIG. 5C.

With reference to FIG. 5C, which shows an example setting 540 of various fields of the L-SIG 530.

a) Rate bits 542 of L-SIG may be set to "BPSK r=½" for CR (or CA) frame.

b) Reserved bit 544 of L-SIG may be set to "1" to indicate the special preamble field.

c) Tail bits 550 of L-SIG may be set to "0." Parity bit P 548, may be set to achieve parity consistency for the L-SIG field 530.

d) Length bits 546 of L-SIG may be set to "duration of CBSMA/CA". L-SIG Length field in CR frame is to protect transmission of CR and CA. It should be set to the duration counted from the beginning of CR to the end of CA frame. Similarly, L-SIG Length field in CA is to protect the CA and following transmissions, and shall follow the existing rule.

Since all CBSMA/CA capable STA use the same settings in L-SIG of CR frame during the contention, therefore SP fields transmitted from multiple stations would be same. This transmission characteristic can be advantageously used by the AP or the other station to simply treat the received signal as a multi-path from a single source. In other words, when multiple stations transmit the special preamble, no additional reception challenged is faced by receiving modules of the AP or another receiver, which typically are designed to mitigate effects of multipath and decode received signal.

Assuming STAs have been synchronized to AP based on AP's DL frame, if the timing and frequency alignment of STAs to AP is within a certain threshold, the AP and other nearby STAs (including legacy ones) could be able to synchronize with the SP of CR frame and decode the L-SIG.

The SP field 522 may optionally include a signature symbol(s) used to identify the following contention-code field and protect CBSMA/CA mechanism from false decoding of contention-code field. All the CBSMA/CA stations use the same SP in CR to contend the medium. With this special preamble in CR, the CBSMA/CA AP could identify transmissions belong to Contention Request of CBSMA/CA mechanism.

In some embodiments, the CC field 524 of CR frame is used to indicate the contention request from a CBSMA/CA station to the AP. A CC field may contain one or more CC symbol(s) 532 after the SP field 522. FIG. 5B shows an example of the CC field containing two symbols, each of CC symbol has its own Cyclic Prefix (CP) 534 and its own Zadoff-Chu sequence (ZC-SEQ) 536.

In some embodiments, a CBSMA/CA station generates a random number R such as using its MAC address as root of the random number generation or using other algorithm when the medium is sensed as idle, and transmits a CC field derived from R following the SP. The CC field has a fixed duration such as one or more OFDM symbols depending on the CC spacing requirement. Different station may generate a different random number and transmit a different CC. The multiple CCs sent from different non-AP stations would be mixed up over the air and received by the CBSMA/CA AP at same time.

Due to propagation delay or error of timing synchronization, Contention Request frames transmitted from different stations may arrive at the AP at different time, which could cause received OFDM symbols misaligned each other and off from AP's timing. In order to reduce the impact of misalignment in received OFDM symbols, the SP and CC symbols in CR frame could use a longer (such as two times) Cyclic Prefix (CP) than the current CP value, so as to make received CR frames sent from different stations within the misaligned timing tolerance range. In addition, CBSMA/CA capable AP may use the control frame to indicate CBSMA/CA capable stations to perform the timing advance before contending HEWOP.

In order for AP to be able to distinguish the received CC fields from different CBSMA/CA stations, the CC field should be selected with characteristics of additive and distinguishable. In practical, the CAZAC or Zadoff-Chu sequences could be used for this purpose and has following characteristics:

1. CAZAC or Zadoff-Chu sequence has constant amplitude which will reduce signal's PAPR requirement during the transmission.

2. Zero auto correlation. If two sequences generated from the same CAZAC root sequence (one sequence is cyclic shifted from other sequence by M) will have zero correlation.

3. Cross correlation of two CAZAC or Zadoff-Chu sequences is $1/\sqrt{N}$, where N is CAZAC or Zadoff-Chu code length. Typically, the length of Zadoff-Chu sequence is chosen a prime number to make better auto-correlation and cross-correlation performance.

For the CC field with single symbol, the physical space of CC is determined by the Zadoff-Chu sequence length (N). The longer of Zadoff-Chu sequence, the more physical contention codes would be available and the less possibility of collision. The physical CC space could be also increased by concatenating two or more Zadoff-Chu symbols in time domain. For example, the CC field with two symbols as shown in FIG. 5B will create the CC physical space of N×N. But the auto-correlation and cross-correlation are only applicable to the single symbol. The CBSMA/CA receiver needs to perform twice auto-correlation and cross-correlation to detect CC field.

During the provisioning, each CBSMA/CA AP can allocate a set of CAZAC or Zadoff-Chu codes for CC of BSS.

Different CBSMA/CA APs in OBSS area may allocate different sets of CAZAC or Zadoff-Chu codes. For example, a BSS may be assigned to a Zadof-Chu root sequence and other sequence derived from the root sequence.

CBSMA/CA AP could broadcast the information of CC set in beacon or Probe Response frame or other frames to notify CBSMA/CA capable stations in the BSS.

A CBSMA/CA capable station which is going to contend the medium can generate a sufficiently unique number within CC set, e.g., using its MAC address or a random number, as the root of the random number generation, or based on other algorithm, and derive Cyclic Shift of Zadoff-Chu sequence as CC code for the Contention Request. The CBSMA/CA station owns the contention code temporarily within the HEWOP.

The CBSMA/CA AP monitors the medium and checks SP field. If the AP receives SP that matches the special preamble of CBSMA/CA, it decodes the contention request information through CC field.

Figure 5D:
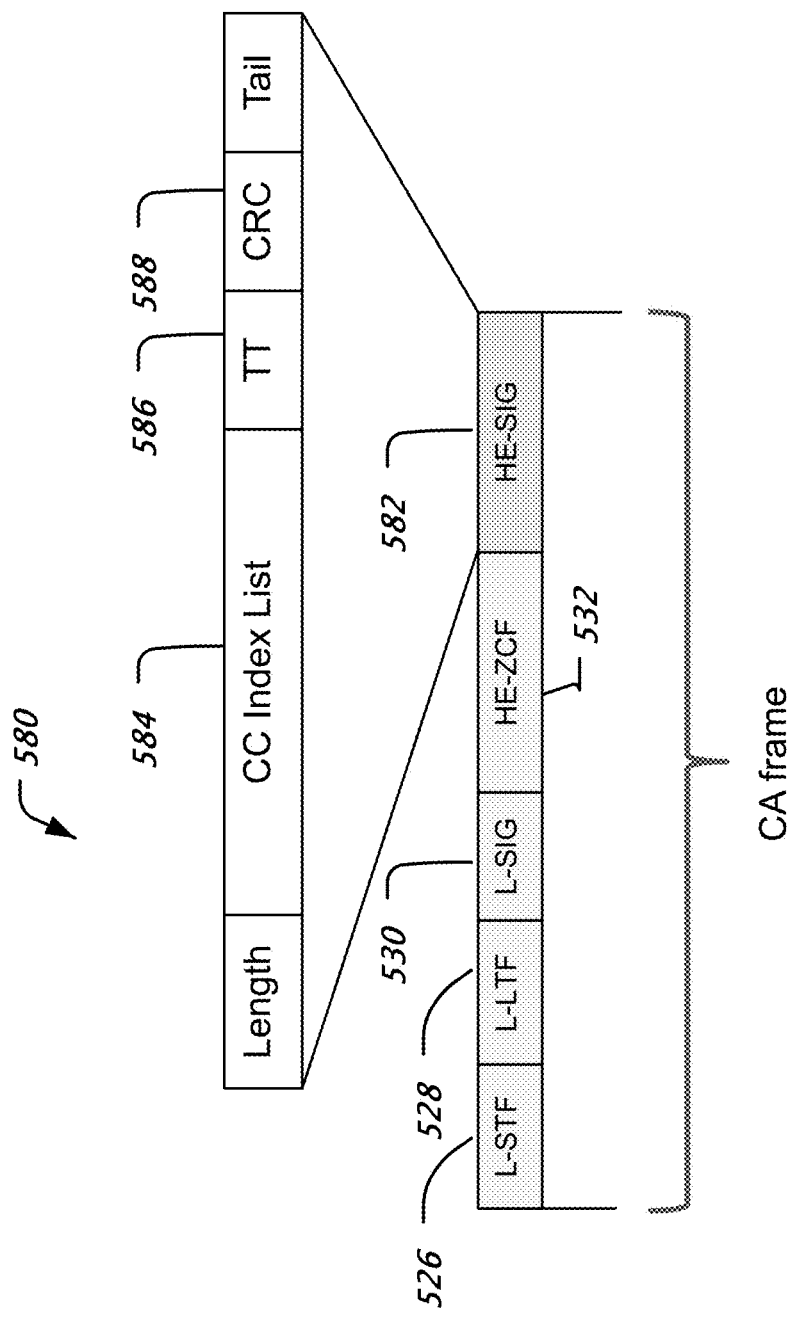
FIG. 5D shows an example of HE-SIG.

In SIFS time after receiving CRs from multiple STAs, the CBSMA/CA AP can transmit the Contention Arbitration (CA) frame 580. FIG. 5D depicts an example CA frame 580. The CA frame 580 is used to arbitrate which contending stations win for the next High Efficient Wireless Opportunity (HEWOP) of transmission.

The CA frame 580 could contain one SP field and/or a CC field with one or more symbol(s) as shown in FIG. 5B. The symbol length of SP field and symbol length of CC field could be same or different, i.e. might use same or different FFT size. In order to reduce the probability of false CA detection that trigger the following HEWOP, the CBSMA/CA mechanism could insert the SP field at the beginning of CA frame like the CR frame. The SP field containing L-STF 526, L-LTF 528 and L-SIG 530 could be used by the CBSMA/CA station to verify CA frame 580. Only having detected the SP field in the SIFS after CR is transmitted, the contending station could start receiving contention code of CA.

In some embodiments, the SP field may optionally include a signature symbol(s) at the end of the transmission to identify the subsequent contention-code field and to protect the CBSMA/CA mechanism from false-decoding the contention code field. The techniques or algorithms to computer the signature symbol(s) of SP field in CA frame could be same as or different from the signature symbol(s) of SP in CR frame.

The CC field with one or more symbol(s) in CA may include one or more CAZAC or Zadoff-Chu sequences that are formed from received CCs in CR frames, which is used to indicate winner(s) of contending stations. If all the contending stations are allowed to transmit in the HEWOP, the CC symbol(s) in CA frame could contain all the received CAZAC or Zadoff-Chu sequences in CRs sent from multiple STAs as shown in the FIG. 5A.

In its role as the central control of the medium occupancy, the AP can arbitrate one or more winning stations by managing CC codes in CA frame so as to prevent too many STAs from flooding into the coming HEWOP. If too many stations are contending the coming HEWOP, the AP can adjust the number of received Zadoff-Chu sequences to be included in CC of CA frame. If a contending station does not detect the CC code in CA which matches to its owned CC code, the contending station knows it has lost the contention in the current HEWOP and would have to wait for a subsequent HEWOP.

As depicted in FIG. 5D, instead of transmitting Zadoff-Chu sequences in CC of CA frame, the CBSMA/CA AP may notify the winning stations for next HEWOP via transmitting the HEW signal (SIG) field 582 that includes a list of winning contention code indices (field 584). After a CBSMA/CA station receives the HEW SIG field 582 in CA, it can compare its contention code index with the list of wining contention code indices to find whether it is the winning station for the following HEWOP. In addition to notifying the winning stations in CA, the AP can also include and use HEW SIG field to indicate the transmission type (TT) 586 in the coming HEWOP. The possible transmission types may be: sequential transmission, OFDMA (orthogonal frequency division multiplexing access), UL MU-MIMO (uplink multiple user multiple input multiple output), etc. According to the granted transmission type, multiple winning stations can transmit data frames in the upcoming HEWOP either sequentially in time, or using OFDMA (e.g., using different time and or frequency resources) or using the UL MU-MIMO mechanism (e.g., using spatial diversity of multiple antenna). The Cyclic Redundancy Code (CRC) sub-field 588 of HEW SIG provides the error checking mechanism for the receiver to verify the information received. The CBSMA/CA AP may also include Length field of L-SIG of CA to indicate the protection time left to the end of CBSMA process. The Length field is used to prevent from other hidden stations to access the medium during the CBSMA/CA winning stations' backoff period, see FIG. 5C, Length field 546. The CBSMA/CA winning stations do not update their NAV values, but other stations should update their NAV according to the duration field of CA.

Figure 6A:
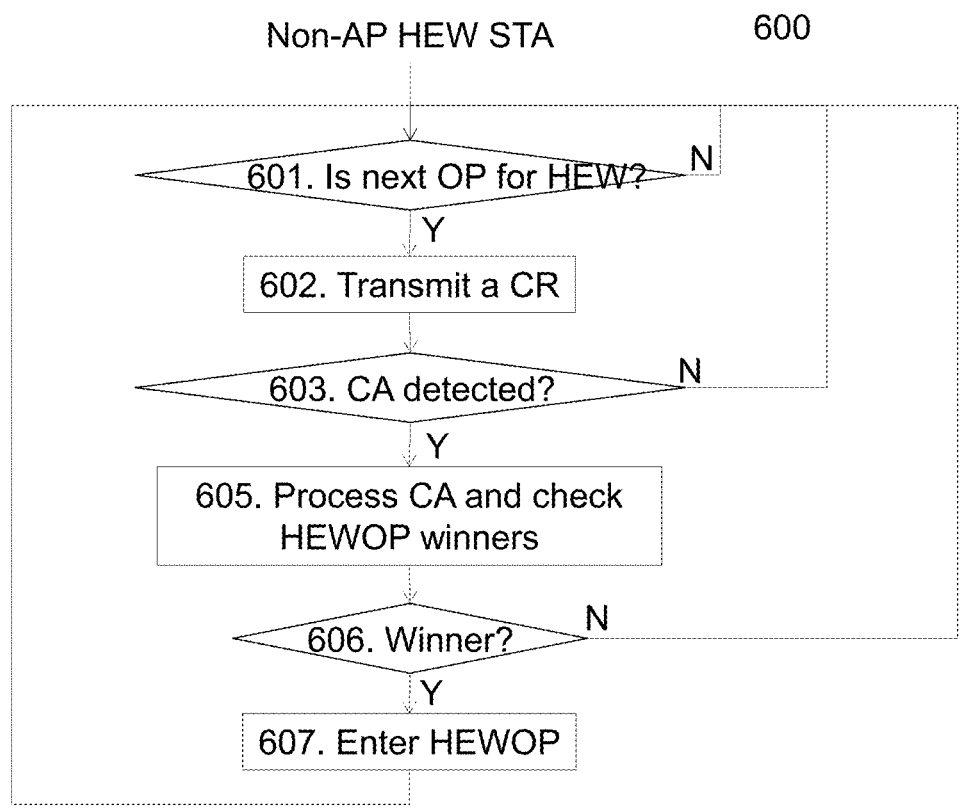
FIG. 6A shows an example of CBSMA/CA procedure for non-AP station.

FIG. 6A shows an example workflow 600 of a CBSMA/CA mechanism for non-AP stations. The workflow 600 may be implemented at a non-AP station in order to interoperate in a wireless communication network (e.g., network depicted in FIG. 1).

At 601, a non-AP CBSMA/CA station detects the next transmission opportunity is for CBSMA/CA stations and measures the medium idle. Non-AP CBSMA/CA stations shall use the training sequence of the frame carrying the HEWOP indication to perform its timing and frequency synchronization with the AP.

At 602, the non-AP CBSMA/CA station generates a random number R for the access category (AC) and transmits a Contention Request (CR) frame including a SP field followed by CC field derived from R.

At 603, after transmitting a CR frame, the non-AP CBSMA/CA station senses the medium and waits for Contention Arbitration (CA) frame. The non-AP CBSMA/CA station first detects the Special Preamble (SP) field of CA frame.

At 604, if the SP field of CA frame is not received, or received incorrectly, the non-AP CBSMA/CA station goes back to the beginning of the workflow 600 to start a new contention for next HEWOP.

Otherwise, at 605, if the non-AP CBSMA/CA station detects the SP field of CA frame, it continues decoding CC field and/or HEW SIG field of CA frame and process the received CA frame.

At 606, the CBSMA/CA contending station checks CA frame to determine the winning stations for the upcoming HEWOP. If the CBSMA/CA contending station finds that it is not the winning station for the coming HEWOP, it then maintains the current CC value and goes to the beginning of the workflow 600 to contend for the next HEWOP. The contending station may update its owned CC according to the received updated information from the CBSMA/CA AP before entering the next HEWOP.

At 607, if the non-AP CBSMA/CA station finds itself is the winning station for the coming HEWOP, it can then use the HEWOP for transmission in the order of CC occurrences in the CA.

For example, the transmission order in the HEWOP could be based on a pre-determined sequencing, e.g., ascending values or indices of the received CC(s) in CA frame. The first winning non-AP station shall send a RTS (Request to Send) to request for occupancy of HEWOP for transmission within the CBSMA process protection period, and set Duration field of RTS to the time required for transmitting PPDUs. The CBSMA/CA AP shall respond with a CTS (Confirm to Send) to confirm that the requesting station can use the medium and add more time to the Duration field of CTS if the CBSMA/CA AP has data buffered to the winning station. Other stations shall use the Duration field of RTS/CTS to update their NAV values indicating medium occupancy via the virtual carrier sensing after receiving RTS/CTS frames.

If the winning STA does not respond CA frame with a RTS within the CBSMA process protection period, and cause time-out of CBSMA, the HEWOP is released for new contention.

In order to prevent from the case that two or more non-AP CBSMA/CA stations generate and use the same contention code for CR causing collision in HEWOP transmission, the first winning CBSMA/CA station(s) may optionally backoff short random time before sending a RTS. If a winning CBSMA/CA station detects the medium being occupied after backoff, it means it loses this HEWOP and has to contend the medium in next HEWOP again. Otherwise, if the medium is sensed idle, the winning non-AP CBSMA/CA can transmit a RTS. The short random backoff is configurable. If the short random backoff is set to "0", then the first winning CBSMA/CA station(s) could transmit a RTS immediately after receiving the CA.

Figure 6B:
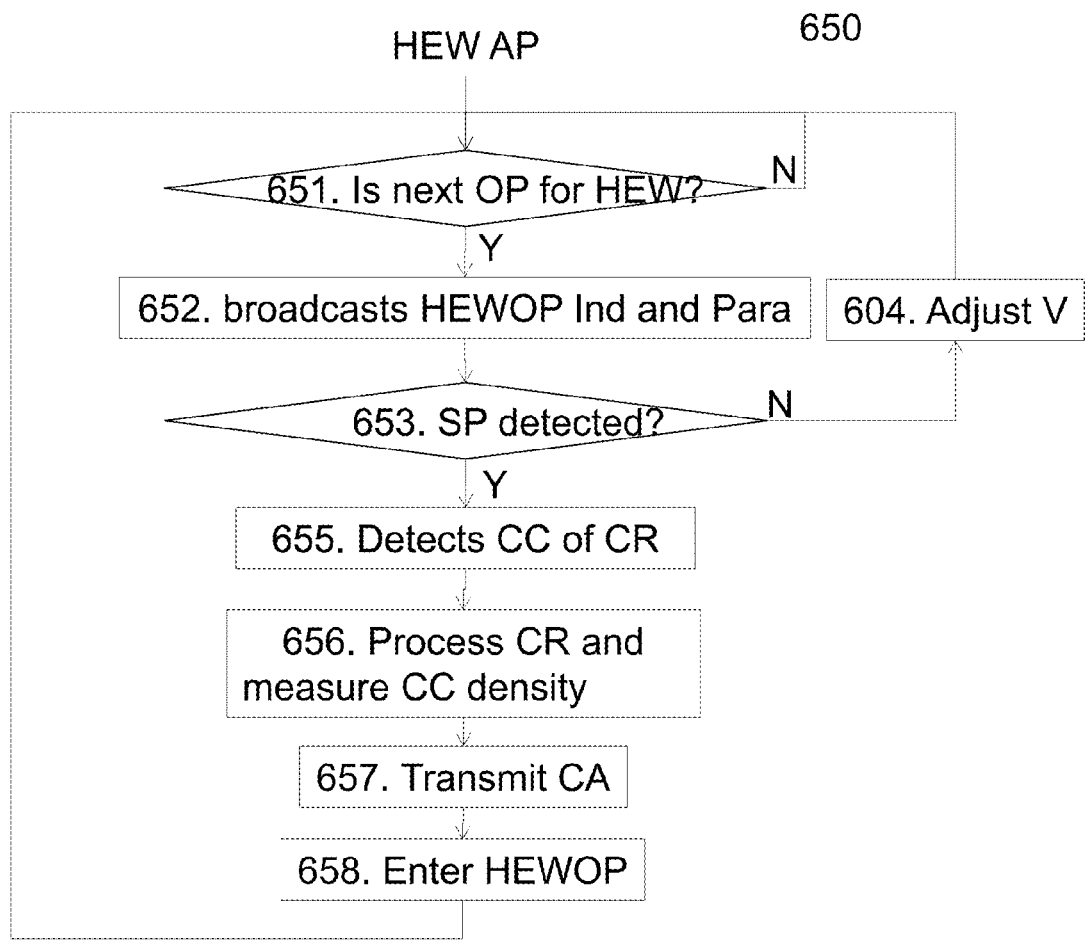
FIG. 6B shows an example of CBSMA/CA procedure for AP.

FIG. 6B shows an example of CBSMA/CA procedure 650 that may be implemented at an AP to coordinate interoperation of multiple transmitting/receiving station and the AP itself.

At 651, the AP verifies that the next transmission opportunity is for HEWOP.

At 652, if the next OP is for HEW, the CBSMA/CA AP broadcast the HEWOP indication in a beacon, management or control frame (in different embodiments) via EDCA procedure after detecting the medium idle and its NAV=0. The AP shall set the Duration field of the frame to the time required by CBSMA process. Legacy stations and CBSMA/CA stations in OBSS may need to update their NAV values according to the Duration information of the frame. Non-AP CBSMA/CA capable stations in the BSS shall use the training sequence of the frame that carries HEWOP indication to perform their timing and frequency synchronization with the timing resource of AP. The CBSMA/CA AP then waits for Contention Request (CR) frames sent from non-AP CBSMA/CA capable stations in xIFS time after the medium is sensed idle.

At 653, the CBSMA/CA AP senses the medium and detects Special Preamble (SP) field of CR frame.

At 654, if the CBSMA/CA AP does not detect the SP field of CR frame for a certain time, the CBSMA/CA AP adjusts the virtual contention space (V) and goes to the beginning of the procedure 650 to start a new contention period.

Otherwise, at 655, if the CBSMA/CA AP detects the SP field of CR frame, it continues decoding CC field of contention request(s).

At 656, the CBSMA/CA AP processes Contention Request(s) frame from non-AP CBSMA/CA station(s).

The CBSMA/CA AP may measure the density of virtual contention space (V) based on number of received CC(s) in CR frames and make sure that the collision probability of CR in next HEWOP remains at a practical level. If the measured density of V is higher than a given threshold, the CBSMA/CA AP then could adjust the V to reduce the probability of collision in the next HEWOP contention.

The CBSMA/CA AP could arbitrate the winning stations according to received CC(s). If there are too many non-AP stations contending the medium at the same time, the CBSMA/CA AP could select the winning stations for the coming HEWOP from the received contending stations, and deny medium access to some contending stations. The decision about which stations to grant access to and which stations to deny access to could be made based on a set of rules. For example, in some embodiments, the decision may take into consideration any service level agreement (SLAs) between the AP operator and the station user.

The CBSMA/CA AP may construct a Contention Arbitration (CA) frame to notify the winning stations for coming HEWOP. The CA frame includes the Special Preamble field with one or more symbol(s) followed by Contention Code field with one or more symbol(s) and the HEW signal (SIG) field with one or more symbols including a list of winning contention code indices and transmission types for HEWOP. The CC field in CA frame could contain one or more CCs used by the winning station(s) in CR frame.

At 657, the CBSMA/CA AP transmits the CA frame to notify winners of contending stations.

At 658, the CBSMA/CA AP enters HEWOP and performs communication with the winning stations.

The CBSMA/CA is a new contention based multiple access mechanism which turns the contention in time domain of the legacy CSMA/CA mechanism into the code domain. It uses a CC to present a Contention Request from a station in an access category. Since the number of CCs (such as Zadoff-Chu sequences) is limited, it is possible for two or more stations to use the same code to request the medium and cause the transmission collision during the HEWOP period. The probability of collisions would increase as the number of contending stations increases.

To reduce the probability of collisions, the CBSMA/CA mechanism could use a virtual contention spaces (V) and real contention space (T) mapping to control possibility of transmission collision in CR frames and HEWOP periods. The real contention space T is the space of Zadoff-Chu sequences.

Figure 7:
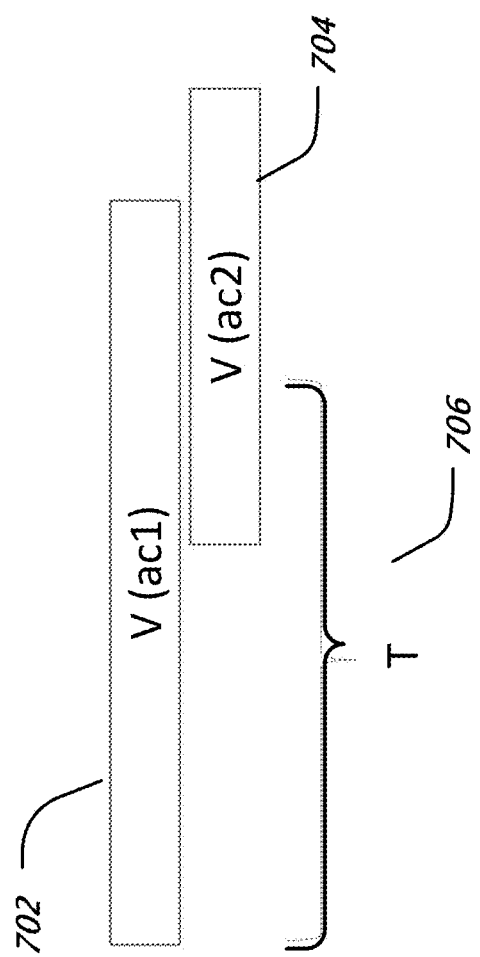
FIG. 7 shows an example of virtual contention space and real contention space.

FIG. 7 shows an example of virtual contention space (V) vs. real contention space (T).

In one example embodiment:
the virtual contention space of CBSMA/CA for access category (AC) is V(ac).
the real contention space of CBSMA/CA for access category (AC) is T(ac) (e.g., 706).

V(ac) could be the same or larger than the T(ac) and can be adjusted by the AP.

Different virtual contention space could be overlapped or non-overlapped, which is controlled by AP (e.g., 702 and 704 shown in FIG. 7).

A number or an item in T(ac) is a transmittable CC in either CR or CA frame, while a number in V(ac) may or may not be able to transmit as contention code. If the number in V(ac) falls into the T(ac), then this number could be able to send in CC symbol.

When a station is contending the medium for the access category (ac) using CBSMA/CA mechanism, the station can generate a random variable R evenly distributed in available space of V(ac). Some of available space could be known from previous Contention Arbitration (CA) frame. If the station finds the R has been used by other station in the CA, it can pick up another value. If the number R falls into the real contention space (T), the station could use R as index (cyclic shift) to derive CC sequence of CR frame. Otherwise, if the R is beyond the real contention space, the station loses transmission opportunity in this CR and waits for the next HEWOP to contend the medium.

The CBSMA/CA AP can control the probability of collisions in CR frame through adjusting the density of virtual contention space. In some embodiments, the AP monitors the number of received CC(s) of CR to estimate the density of virtual contention space.

If the CBSMA/CA AP detects the number of received CC in CR(s) is high, it can increase size of V(ac) to reduce the density of virtual contention space so as to reduce the probability of collision in the real contention space T within a certain level.

If CBSMA/CA AP detects the number of received CC(s) in CR is lower than a threshold, it can reduce sized of V(ac) to increase the density of virtual contention space to give more chance to stations to contend the medium.

Figure 8:
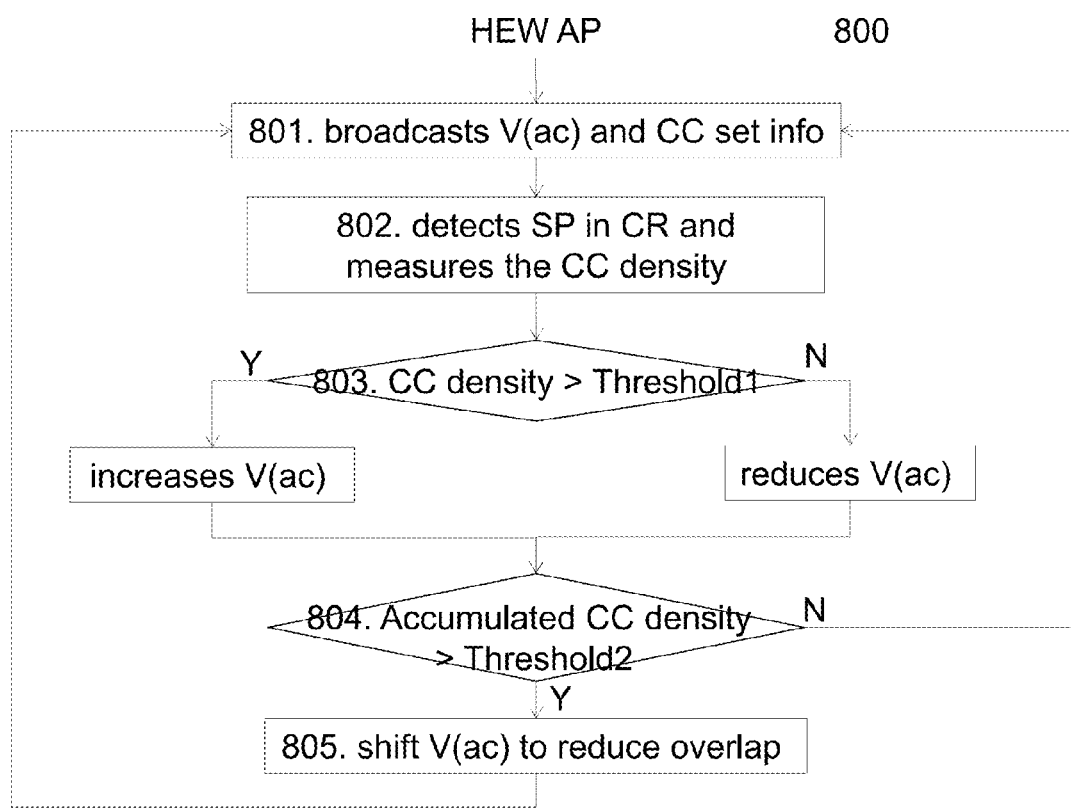
FIG. 8 shows an example of controlling collision probability.

FIG. 8 shows an example workflow 800 of controlling probability of collision via adjusting the density of virtual contention space. The workflow 800 may be implemented at an AP to facilitate efficient interoperation of multiple wireless devices.

At 801, the CBSMA/CA AP monitors the medium and broadcasts the parameters of virtual contention space (ac) and CC set information in beacon, or management frames periodically.

At 802, when entering the HEWOP contention period, the CBSMA/CA AP monitors CRs sent from multiple stations and measures the CC density in the real contention space T which could be used to estimate the density in the virtual contention space V. The CBSMA/CA AP can derive the received CC density for each access category from number of CCs. For example, the received CCs in the real contention space T of FIG. 7 is contributed from CC(s) for AC1 and CC(s) for AC2. The small value CC(s) in T are used by only CC(s) for AC1 and larger value CC(s) in T are used by AC1 and AC2. Therefore, the CC density for AC1 could be measured directly in small value CC of T, while the CC density for AC2 could be derived from the measurement of large CC density subtracting CC density of AC1.

At 803, if the measured CC density for AC is larger than the given threshold (Threshold 1), the CBSMA/CA AP increases the virtual contention space V(ac) via increasing the upper bound H(ac). Otherwise, the CBSMA/CA AP decreases the virtual contention space V(ac) via decreasing the lower bound L(ac) and upper bound H(ac).

At 804, if the AP detects the aggregated CC density from all the virtual contention spaces for access categories is not larger than a given threshold (Threshold 2), the AP broadcasts the virtual contention space V(ac).

Otherwise, at 805, the AP shifts V(ac) to reduce the overlap between the virtual contention spaces and then broadcast the virtual contention space V(ac).

Figure 9:
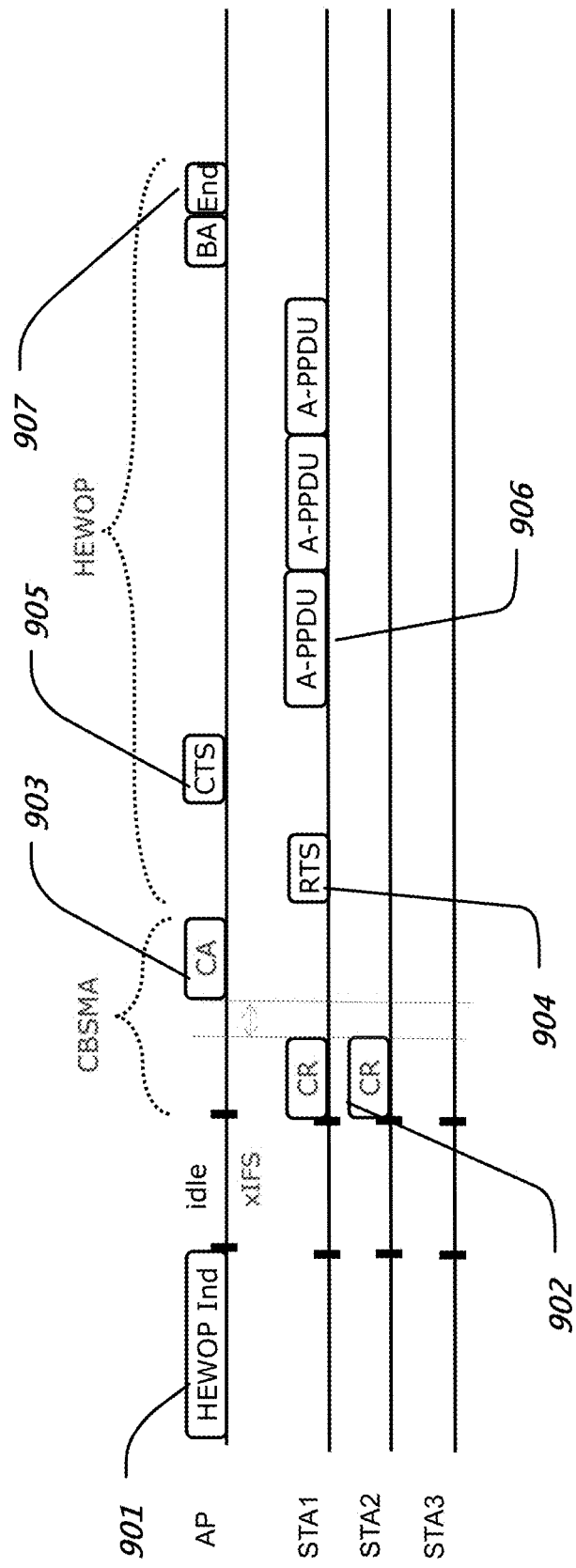
FIG. 9 shows an example of one winning station's transmission in HEWOP.

FIG. 9 shows an example timeline of transmissions in HEWOP for the winning contending station. As seen from top to bottom of the drawing, with time increasing from left to right, the following sequence of events may take place:

901. The CBSMA/CA AP transmits a frame indicating that the next transmission opportunity is designated for HEWOP after detecting medium idle and its NAV=0. The CBSMA/CA AP sets the Duration field of the frame to the time required by CBSMA process. Legacy stations and CBSMA/CA stations in OBSS may use the Duration information to update their NAV values. Non-AP CBSMA/CA stations in the BSS use the training sequence of that frame including HEWOP Indication to perform timing synchronization with the CBSMA/CA AP.

902. After xIFS time, the CBSMA/CA station STA1 and STA2 check their NAV values (=0) and contend the medium via CBSMA/CA mechanism in the code domain. STA1 and STA2 transmit a CR frame respectively at same time.

903. After detecting the special preamble of CR frames sent from CBSMA/CA stations STA1 and STA2, the CBSMA/CA AP responds with a CA frame indicating that CRs were received and arbitrating the winning stations for the next HEWOP.

904. According to CC(s) in CA frame, the winning station STA1 transmits an RTS to request occupancy of the medium immediately or after backoff a short random time and still sensing the medium idle, depending on the configuration. The STA1 sets the Duration field of RTS to the time required for transmitting the data frame, ACK frame and SIFSs.

905. The CBSMA/CA AP responds with a CTS to confirm the occupancy of the medium. If the CBSMA/CA AP has data packet buffered for the STA1, it can add additional time required for transmitting PPDU to STA1 in the Duration field of CTS. Other stations can use the Duration fields of RTS/CTS to set their NAV values accordingly for virtual carrier sensing.

906. The CBSMA/CA STA1 starts the packet data transmission in the HEWOP.

907. The CBSMA/CA AP may terminate the HEWOP after the end of communication via sending an implicit HEWOPend indication or explicit HEWOPend frame. Upon the HEWOP being terminated, other stations that used information from frames of RTS/CTS as the most recent basis to update their NAVs are permitted to reset their NAVs accordingly.

Figure 10:
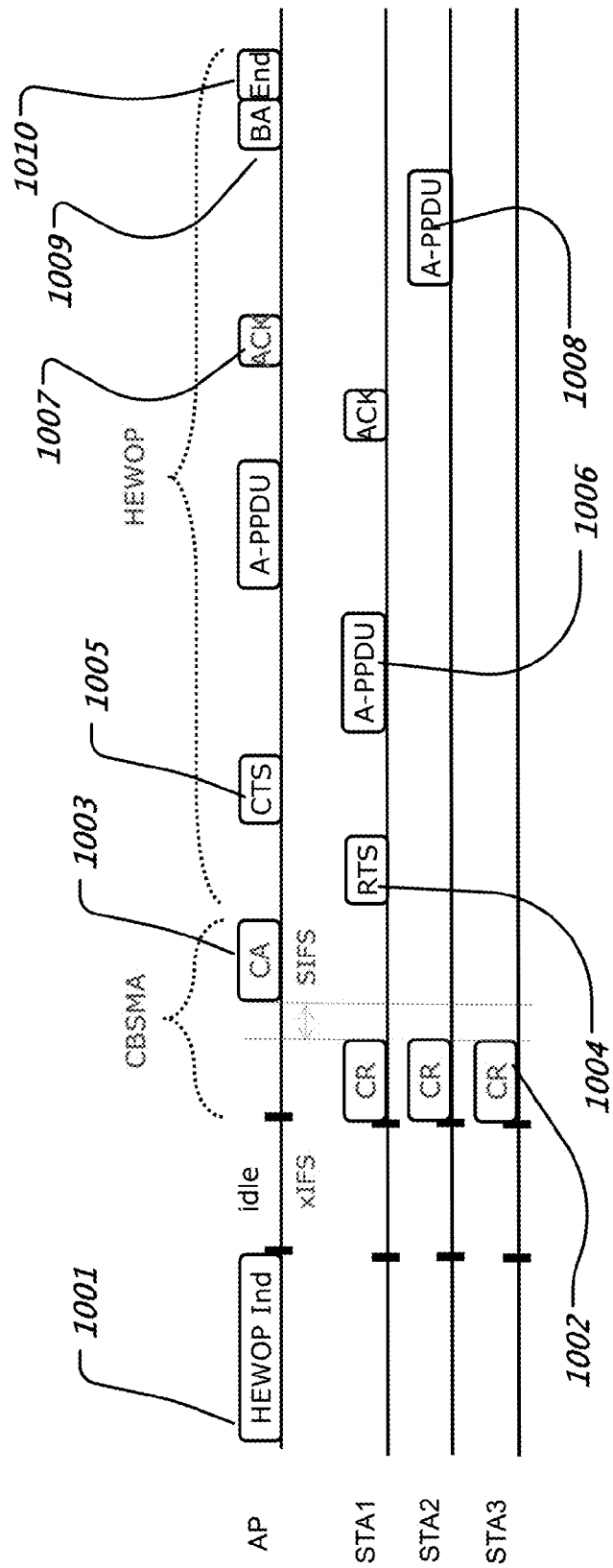
FIG. 10 shows an example of multiple winning stations' transmission in HEWOP.

The CBSMA/CA mechanism may allow multiple winning stations to transmit in the same HEWOP as shown in FIG. 10.

FIG. 10 shows an example of two winning stations with CBSMA/CA capability transmitting A-PPDUs in the same HEWOP, using sequential transmission mechanism. As seen from top to bottom of the drawing, with time increasing from left to right, the following sequence of events may take place:

1001. The CBSMA/CA AP transmits a frame indicating that the next transmission opportunity is designated for HEWOP after detecting medium idle and its NAV=0. The CBSMA/CA AP sets the Duration field of the frame to the time required by the CBSMA process. Legacy stations and CBSMA/CA stations in OBSS may update their NAV values according to the Duration information. Non-AP CBSMA/CA stations in the BSS use the training sequence of that frame with HEWOP Indication to perform timing synchronization with the CBSMA/CA AP.

1002. After xIFS time, the CBSMA/CA station STA1, STA2 and STA3 check their NAV values (=0) and contend the medium using CBSMA/CA mechanism. STA1, STA2 and STA3 transmit a CR frame with different CCs respectively at same time: assume CC1<CC2<CC3.

1003. After detecting the SP of CR frames from stations, the CBSMA/CA AP responds with a CA frame indicating that CR frame were received and arbitration of winning stations for the next HEWOP.

According to CCs in CA frame, CBSMA/CA stations STA1 and STA2 win the HEWOP to transmit data packet and know to transmit in sequential order within HEWOP based on TT of CA. STA1 and STA2 monitor the activities in HEWOP and prepare for transmissions, and STA3 may go to sleep in current HEWOP and contend the medium in the next HEWOP.

1004. The first station STA1 according to the transmission order can send a RTS to the AP either immediately or after backoff a short random time and still sensing the medium idle, which depends on configuration. By default, the transmission order may be that the winning station with the smallest value or index of contention code starts transmission first (other rules are possible). After the first winning station completes the data exchange with the CBSMA/CA AP, then the station with the second smallest contention code value or index starts transmission. STA1 may set the Duration field in RTS according to the transmission time required for its data packet to the CBSMA/CA AP.

1005. The CBSMA/CA AP responds with a CTS to confirm the occupancy of the medium. If the CBSMA/CA AP has packet data buffered for the STA1, it can add additional time required for transmitting those data to STA1 in the Duration field of CTS, plus extra time for re-transmitting an ACK with switching indication if the CBSMA/CA is configured to re-transmit the ACK in the case of missing the response of the first ACK. Other stations can use the Duration fields of RTS/CTS to set their NAV values for virtual carrier sensing.

1006. The STA1 starts the packet data transmission in the HEWOP. During the STA1 transmission, STA2 monitors the status of medium usage. If STA2 detects the Duration of frame between STA1 and AP is equal to the maximum duration of HEWOP (HEWOPlimit), i.e. STA1 uses up all the transmission time of HEWOP, the STA2 will not have a chance to transmit any data in the current HEWOP and may go to sleep till next HEWOP for medium contention.

1007. After CBSMA/CA STA1 completes the transmission, the CBSMA/CA AP sends an ACK with switching transmission indication in an ACK frame.

1008. Once STA2 receives an ACK frame with the switching transmission indication and there is still time available in current HEWOP, the STA2 starts transmission in the HEWOP immediately after SIFS, or may check its NAV value and starts transmission if NAV=0. If the next winning STA does not respond the frame of ACK with switching indication via transmitting a PPDU within a certain time such as SIFS, the CBSMA/CA AP will wait for the PIFS for example to send another ACK frame with switching indication if the re-transmission of ACK is configured. If the HEWOP times out before the CBSMA/CA AP receive a response from the next winning station STA2, this HEWOP is released for new contention.

1009. Once the transmission from STA2 completes, the CBSMA/CA AP responds with a BA to confirm the receiving from STA2.

1010. The CBSMA/CA AP may terminate the HEWOP after the end of communications via sending an implicit HEWOP end indication or explicit HEWOPend frame. Upon the HEWOP being terminated, other stations that used information from the frame exchange as the most recent basis to update their NAV values are permitted to reset their NAVs accordingly.

The CBSMA/CA AP may implicitly or explicitly indicate the last contention code (for example CC2) used in the HEWOP transmission. Other stations that do not have a chance to transmit in the HEWOP could update their contention code by its current owned CC minus the last CC (for example CC2), and use the updated contention codes to contend the medium in the next HEWOP.

Figure 11:
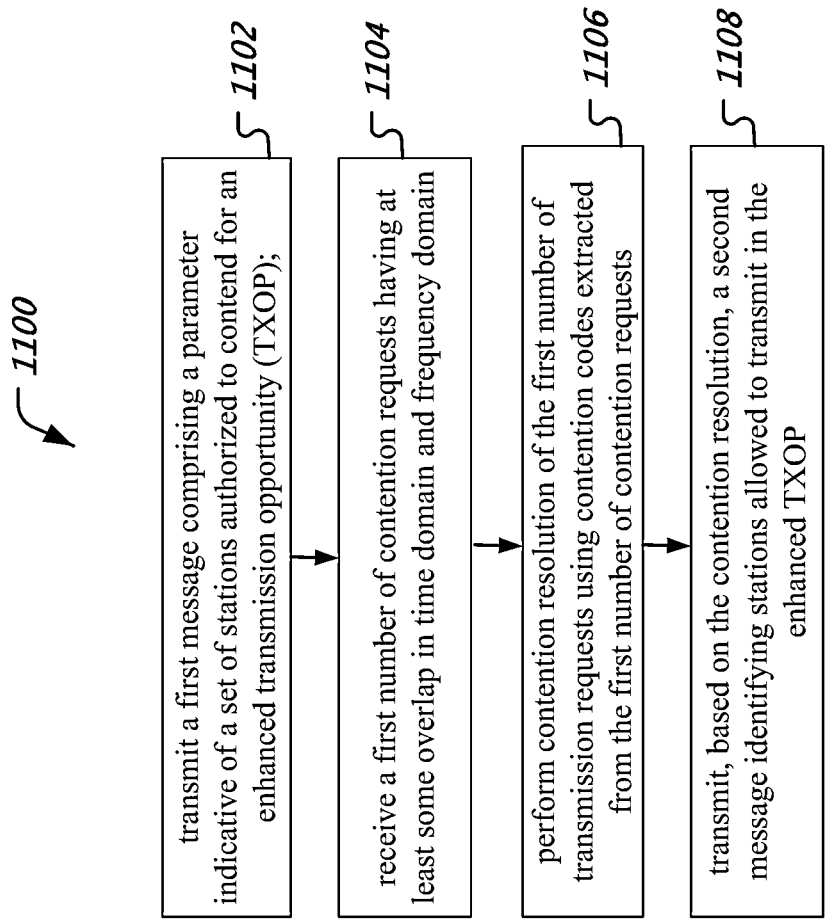
FIG. 11 shows an example method of controlling operation of a wireless network comprising an access point and a plurality of stations.

FIG. 11 illustrates an example method 1100 of controlling operation of a wireless network comprising an access point and a plurality of stations. The method 1100 may be implemented at a CBSMA/CA AP. As disclosed in the present document access point, e.g., may control transmissions in the wireless network by providing control messages such as transmission opportunities.

The method 1100 includes, at 1102, transmitting a first message comprising a parameter indicative of a set of stations authorized to contend for an enhanced transmission opportunity (TXOP). The enhanced TXOP may be, e.g., the HEWOP transmission opportunity described in the present document, e.g., with respect to FIGS. 6A, 9 and 10.

The method 1100 includes, at 1104, receiving a first number of contention requests having at least some overlap in time domain and in frequency domain. For example, the reception of two different contention requests may occur at least at the same time and in the same frequency region. In some embodiments, the reception may be performed by monitoring a wireless channel (e.g., an 802.11 channel) for a first special preamble and decoding one or more contention code symbols when the first special preamble is detected. Some examples of special preambles have been provided in preceding description. The contention request may include a configurable extended length of Cyclic Prefix (CP) of OFDM symbols in the first special preamble and the contention code. Some examples of CR frames that make up a CR have been disclosed, e.g., with reference to FIGS. 5A, 5B, 5C and 5D.

The method 1100 includes, at 1106, performing contention resolution of the first number of transmission requests using contention codes extracted from the first number of contention requests.

The method 1100 includes, at 1108, transmitting, based on the contention resolution, a second message identifying stations allowed to transmit in the enhanced TXOP. In some embodiments, the method may be implemented at an AP. In some embodiments, e.g., disclosed and discussed in FIGS. 5A, 5B, 5C and 5D, the second message includes a second special preamble, followed by one or more contention code symbols and/or signal symbols for transmission type.

In some embodiments, based on the first number of received contention requests, the AP may estimate an active station density. The AP may compare the estimate with a first threshold and a second threshold, both of which may be programmable by an operator of the AP, e.g., a service provider or a network operator. In some embodiments, when the estimated active station density is above the first threshold and/or below the second threshold, the AP may adjust, for a subsequent first message, the number of stations that are allowed to send their CRs. For example, if more than the first threshold number of stations are present, (e.g., more than 10%), then the AP may increase the opportunities for stations to transmit CRs. Similarly, if there are fewer than the second threshold stations present, then the AP may reduce number of CR opportunities being granted.

As described in this document, in some embodiments, orthogonal codes may be used to identify stations. For example, the second message may include, for each identified station, a corresponding orthogonal sequence uniquely identifying the station uniquely. For example, a CABAC or a Zadoff-Chu sequence associated with each station may be used in the second message to identify the station.

Figure 12:
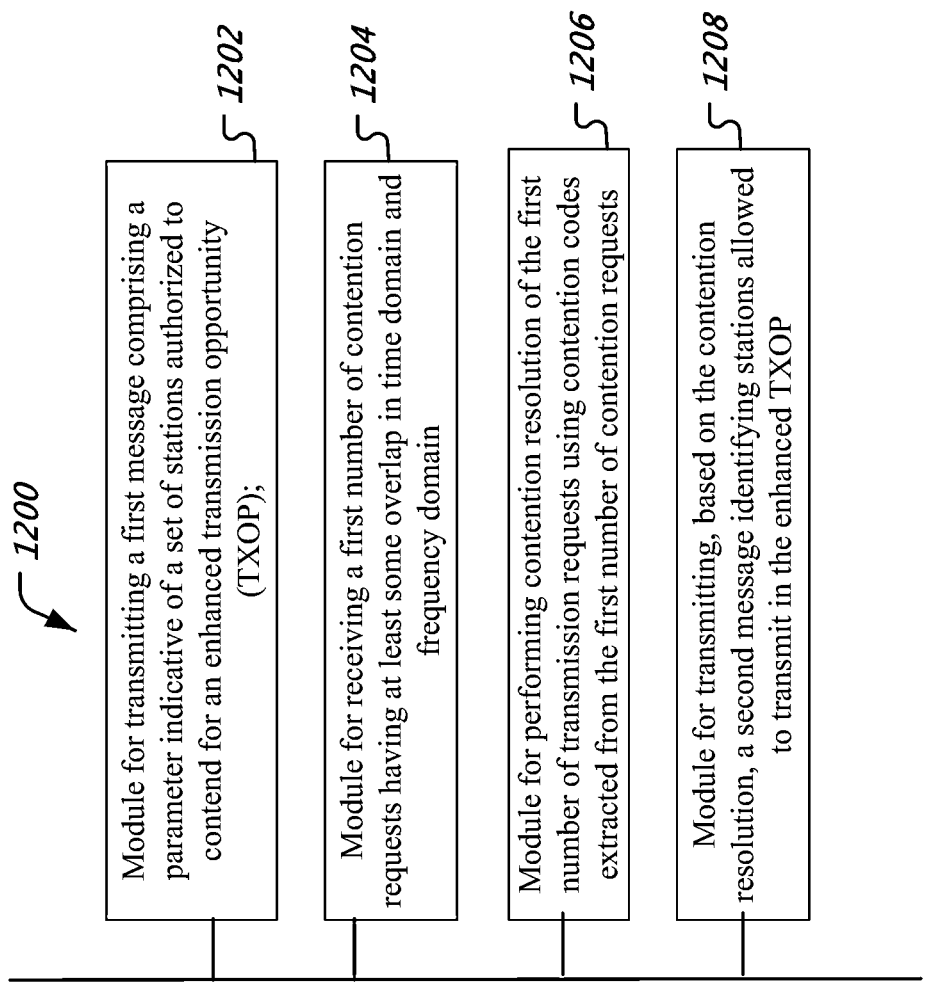
FIG. 12 shows an example apparatus for controlling operation of a wireless network comprising an access point and a plurality of stations.

FIG. 12 illustrates an example apparatus 1200 for controlling operation of a wireless network comprising an access point and a plurality of stations. The apparatus 1200 includes module 1202 for transmitting a first message comprising a parameter indicative of a set of stations authorized to contend for an enhanced transmission opportunity (TXOP). The apparatus 1200 includes module 1204 for receiving a first number of contention requests having at least some overlap in a time domain and a frequency domain. The apparatus 1200 includes module 1206 for performing contention resolution of the first number of transmission requests using contention codes extracted from the first number of contention requests. The apparatus 1200 includes module 1208 for transmitting, based on the contention resolution, a second message identifying stations allowed to transmit in the enhanced TXOP. In some embodiments, the method may be implemented at an AP.

Figure 13:
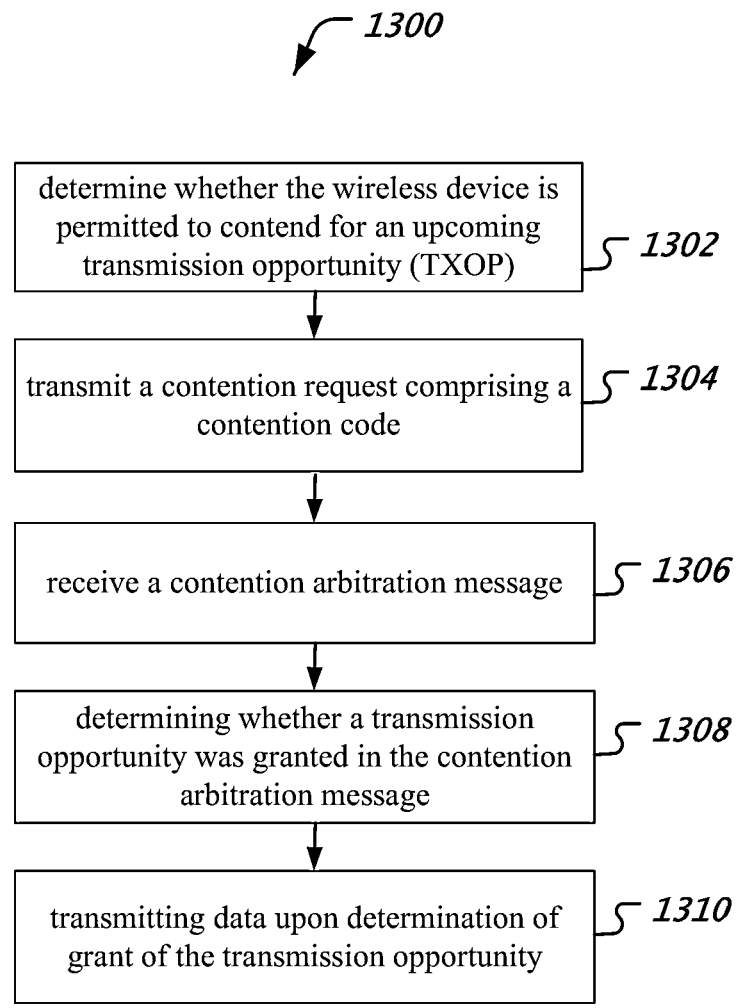
FIG. 13 shows an example method implemented at a wireless device.

FIG. 13 depicts an example wireless communication method 1300 implemented at a wireless device.

The method 1300 includes, at 1302, determining whether the wireless device is permitted to contend for an upcoming transmission opportunity (TXOP). In some embodiments, the determination of whether the transmission opportunity was granted is performed based by detecting whether the contention arbitration message includes a reference to the contention code used by the wireless device.

The method 1300 includes, at 1304, transmitting, when permitted, a contention request comprising a contention code. As described in this document, the contention code may include an orthogonal or pseudo orthogonal code based on a unique identifier for the wireless device. In some embodiments, the contention request transmission may include a special preamble followed by at least one orthogonal frequency division multiplexing (OFDM) symbol indicative of the contention code. In some embodiments, a configurable extended length of Cyclic Prefix (CP) of OFDM symbols in a special preamble and the contention code may be used.

The method 1300 includes, at 1306, receiving a contention arbitration message in response to the contention request.

The method 1300 includes, at 1308, determining whether a transmission opportunity was granted in the contention arbitration message. As disclosed in this document, the determination can be made by checking whether or not the station's ID is included in a protocol data unit carried in the contention arbitration message. The determination may be made by receiving an orthogonal code, e.g., CABAC or a Zadoff-Chu sequence, or a concatenation thereof, that uniquely identifies the receiving station.

The method 1300 includes, at 1310, transmitting data upon determination of grant of the transmission opportunity.

Figure 14:
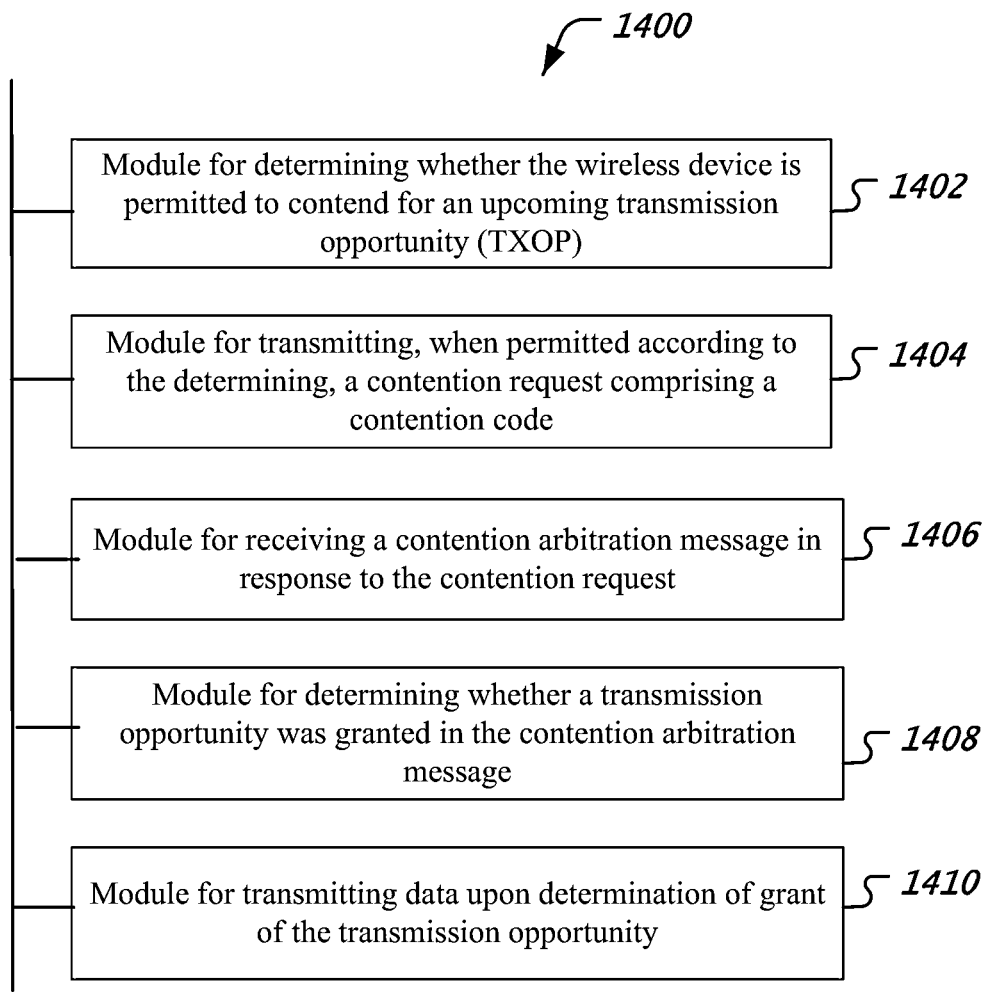
FIG. 14 shows an example wireless communication apparatus.

FIG. 14 depicts an example wireless communication apparatus 1400 implemented at a wireless device. The apparatus 1400 includes module 1402 for determining whether the wireless device is permitted to contend for an upcoming transmission opportunity (TXOP). The apparatus 1400 includes module 1404 for transmitting, when permitted, a contention request comprising a contention code. The apparatus 1400 includes module 1406 for receiving a contention arbitration message in response to the contention request. The apparatus 1400 includes module 1408 for determining whether a transmission opportunity was granted in the contention arbitration message. The apparatus 1400 includes module 1410 for transmitting data upon determination of grant of the transmission opportunity.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of controlling operation of a wireless network comprising an access point and a plurality of stations, comprising:
    transmitting a first message comprising a parameter indicative of a set of stations authorized to contend for an enhanced transmission opportunity (TXOP);
    receiving a first number of contention requests having at least some overlap in time domain and frequency domain, wherein each of the first number of contention requests includes a first special preamble and one or more orthogonal contention field symbols;
    monitoring a wireless channel for the first special preamble in each of the first number of content contention requests, wherein the first special preamble includes a signature symbol to identify and allow decoding of the one or more orthogonal contention field symbols;
    decoding the one or more orthogonal contention field symbols of a contention request when the one or more orthogonal contention field symbols are identified by the first special preamble of the contention request;
    performing contention resolution of the first number of transmission requests using the one or more orthogonal contention field symbols extracted from the first number of contention requests; and
    transmitting, based on the contention resolution, a second message identifying stations allowed to transmit in the enhanced TXOP.

2. The method of claim 1, wherein the contention request includes:
    a configurable extended length of Cyclic Prefix (CP) of OFDM symbols in the first special preamble and the one or more orthogonal contention field symbols.

3. The method of claim 1, wherein each of the one or more orthogonal contention field symbols-comprises its own cyclic prefix and Zadoff-Chu sequence (ZC-SEQ).

4. The method of claim 1, wherein the transmitting the second message includes transmitting the second message by including a second special preamble, followed by one or more orthogonal contention field symbols and/or signal symbols for transmission type and/or arbitration information.

5. The method of claim 1, further comprising:
    estimating an active station density based on the first number; and
    adjusting the parameter to change a size of the set of stations when the estimated active station density is above a first threshold or below a second threshold.

6. The method of claim 1, wherein the second message includes, for each identified station, a corresponding orthogonal sequence uniquely identifying the station.

7. The method of claim 6, wherein the orthogonal sequence is one of a CAZAC sequence and a Zadoff-Chu sequence.

8. The method of claim 1, wherein the first number of contention requests include an initial protocol data unit that is similar to each other and wherein the receiving includes performing a multipath correction on the received first number of contention requests considered as multipath images of each other.

9. The method of claim 2, wherein the special preamble includes legacy fields L-STF, L-LTF and L-SIG.

10. The method of claim 3, wherein each of the orthogonal sequence is corresponding to a contending station.

11. The method of claim 4, wherein the second special preamble includes legacy fields L-STF, L-LTF and L-SIG.

12. An apparatus for controlling operation of a wireless network comprising an access point and a plurality of stations, comprising:
    transmission circuitry that transmits a first message comprising a parameter indicative of a set of stations authorized to contend for an enhanced transmission opportunity (TXOP);
    reception circuitry that receives a first number of contention requests having at least some overlap in a time domain and a frequency domain, wherein each of the first number of contention requests includes a first special preamble and one or more orthogonal contention field symbols;
    a special preamble monitoring module that monitors a wireless channel for the first special preamble in each of the first number of contention requests, wherein the first special preamble includes a signature symbol to identify and allow decoding of the one or more orthogonal contention field symbols;
    an orthogonal contention field decoder module that decodes the one or more orthogonal contention field symbols when the one or more orthogonal contention field symbols are identified by the first special preamble of the contention request;
    a contention resolution module that performs contention resolution of the first number of transmission requests using the one or more orthogonal contention field symbols extracted from the first number of contention requests; and wherein the transmission circuitry further transmits, based on the contention resolution, a second message identifying stations allowed to transmit in the enhanced TXOP.

13. The apparatus of claim 12, wherein the contention request includes a configurable extended length of Cyclic Prefix (CP) of OFDM symbols in the first special preamble and the one or more orthogonal contention field symbols.

14. The apparatus of claim 12, wherein the transmission circuitry includes a module transmitting the second message by including a second special preamble, followed by one or more orthogonal contention field symbols and/or signal symbols for transmission type.

15. The apparatus of claim 12, further comprising:
an active station density estimation module that estimates an active station density based on the first number; and
a code adjustment module that adjusts the parameter to change a size of the set of stations when the estimated active station density is above a first threshold or below a second threshold.

16. The apparatus of claim 13, wherein the special preamble includes legacy fields L-STF, L-LTF and L-SIG.

17. A wireless communication method implemented at a wireless device, comprising:
determining whether the wireless device is permitted to contend for an upcoming transmission opportunity (TXOP);
transmitting, when permitted according to the determining, a contention request comprising a first special preamble and an orthogonal contention field, wherein the first special preamble includes a signature symbol to identify the orthogonal contention field;
receiving a contention arbitration message in response to the contention request, the contention arbitration message including a second special preamble and a reference field, wherein the reference field includes references to one or more orthogonal contention fields of a list of wireless devices and is indicative of a transmission opportunity for the list of wireless devices;
determining whether the transmission opportunity was granted in the contention arbitration message by detecting whether the reference field includes a reference to the orthogonal contention field used by the wireless device; and
transmitting data upon determination of grant of the transmission opportunity.

18. The method of claim 17, wherein the orthogonal contention field comprises an orthogonal or pseudo orthogonal code based on a unique identifier for the wireless device.

19. The method of claim 17, wherein the orthogonal contention field comprises:
at least one orthogonal frequency division multiplexing (OFDM) symbol.

20. The method of claim 17, wherein the transmitting the contention request includes:
using a configurable extended length of Cyclic Prefix (CP) of OFDM symbols in the special preamble and the orthogonal contention field.

21. The method of claim 17, wherein the transmitting the contention request includes:
transmitting a pre-assigned orthogonal sequence that uniquely identifies the transmitting entity.

22. The method of claim 17, wherein the contention request comprises a first protocol data payload portion that is identical to a corresponding legacy protocol data payload and a second protocol data payload portion that is different from the corresponding legacy protocol data payload.

23. The method of claim 20, wherein the special preamble includes legacy fields L-STF, L-LTF and L-SIG.

24. The method of claim 17, wherein the reference field includes one or more orthogonal contention symbols indicative of the list of wireless devices.

25. The method of claim 17, wherein the reference field includes a list of contention code indices for the list of wireless devices.

26. A wireless communication apparatus, comprising:
a memory, a processor, a transmitter circuit and a receiver circuit,
wherein the processor:
reads instructions from the memory and determines whether the wireless device is permitted to contend for an upcoming transmission opportunity (TXOP);
causes, when permitted, the transmitter circuit to transmit a contention request comprising a first special preamble and a contention code, wherein the first special preamble includes a signature symbol to identify the contention code;
wherein the receiver circuit receives a contention arbitration message in response to the contention request, the contention arbitration message including a second special preamble and a reference field, wherein the reference field includes references to one or more contention codes of a list of wireless devices and is indicative of a transmission opportunity for the list of wireless devices;
wherein the processor further determines whether the transmission opportunity was granted in the contention arbitration message by detecting whether the reference field includes a reference to the contention code used by the wireless device; and
wherein the transmitter circuit transmits data upon determination of grant of the transmission opportunity.

27. The apparatus of claim 26, wherein the contention code comprises an orthogonal or pseudo orthogonal code based on a unique identifier of the wireless device.

28. The apparatus of claim 26, wherein the contention code comprises:
at least one orthogonal frequency division multiplexing (OFDM) symbol.

29. The apparatus of claim 28, wherein the contention request includes a configurable extended length of Cyclic Prefix (CP) of OFDM symbols in a special preamble and the contention field.

30. The apparatus of claim 29, wherein the special preamble includes legacy fields L-STF, L-LTF and L-SIG.

31. The apparatus of claim 26, wherein the reference field includes one or more orthogonal contention symbols indicative of the list of wireless devices.

32. The apparatus of claim 26, wherein the reference field includes a list of contention code indices for the list of wireless devices.

* * * * *